May 18, 1965 D. AKEIREB Re. 25,781

PREMIUM HOLDING PACKAGE

Original Filed July 30, 1962

Inventor
David AKEIREB

Attorney

United States Patent Office

Re. 25,781
Reissued May 18, 1965

25,781
PREMIUM HOLDING PACKAGE

David Akeireb, P.O. Box 1861, Station B,
Montreal, Quebec, Canada

Original No. 3,139,981, dated July 7, 1964, Ser. No. 213,475, July 30, 1962. Application for reissue July 7, 1964, Ser. No. 391,824
2 Claims. (Cl. 206—47)

Matter enclosed in heavy brackets [ ] appears in the original patent but forms no part of this reissue specification; matter printed in italics indicates the additions made by reissue.

The present invention relates to improvements in the manufacture of display packages or holders, particularly packages of this nature that are designed to hold or to be attached to more than one article, for example, a bottle or can plus a premium such as a dispenser or the like.

It is common practice today to merchandize various types of bottles or canned liquids, for example, detergents, window cleaners, hand lotions or the like with one or more bottles as a packaged unit with a suitable dispenser. Usually the dispenser is attached to the package by some means permitting its display along with the bottle, for example, by a tab or extension of the bottle holding package or a paper band. These expedients while serving the purpose of displaying the dispenser or like premium do not provide any means of preventing pilfering of the premium which is common particularly in large chain stores or the like.

The present invention recognizes this and other problems inherent in the prior art bottle holding packages and aims to provide an improved construction of an article of this nature that can be easily yet securely attached to one or more bottles or cans and which also includes means to retain a dispenser in a manner which will minimize the usual pilfering. Further, the construction of the present package is such that it fits securely about the neck of the bottles or cans so that when a dispenser is placed between a pair of bottles as a unit package the dispenser head can be used as a carrying handle.

More specifically, the package unit or holder of the invention consists essentially of a one piece rectangular blank of paperboard or cardboard which is creased and folded to provide a relatively shallow rectangular [open ended] box which is provided with a series of registering openings which fit snugly over the neck of the bottles or cans with additional openings to receive and retain a dispenser. These openings are arranged in three spaced apart rows along the length of the blank so that when it is folded into three overlapping panels the holes are aligned from top to bottom. The first row of holes is dimensioned so as to fit snugly about the neck of a bottle or bottles and to accommodate the plunger portion only of a dispenser. The second row of holes is again a snug fit for the bottle caps with the dispenser accommodating opening being considerably smaller than the threaded cap portion but sufficiently large to permit passage of the usual dispenser plunger top. The third row of holes is larger permitting them to fit over the respective bottle or can caps and the corresponding threaded cap of the dispenser.

When the present holder is assembled, say for example, to a preferred arrangement of two capped bottles with a dispenser inbetween, the portion bearing the first row of holes is placed on and pushed firmly down over the bottle caps and the dipsenser stem is placed in the central opening. The portion of the blank bearing the third row of holes is then folded inwardly between the portions bearing the first and second row so as to align the openings in the second and third rows. These overlapped portions are then folded over the assembled bottles and dispenser so that the dispenser head and bottle caps are locked within the interior of the open ended rectangular package thus formed. With this arrangement, the dispenser cannot be withdrawn without removal of the unit from the bottle tops but the entire unit can be easily removed by the purchaser by either unscrewing the bottle caps or by exerting sufficient force to deform the lowest retaining openings.

Having thus generally described the nature of the invention, particular reference will be made to the accompanying drawings, showing by way of illustration a preferred embodiment thereof, and in which.

Figure 1:
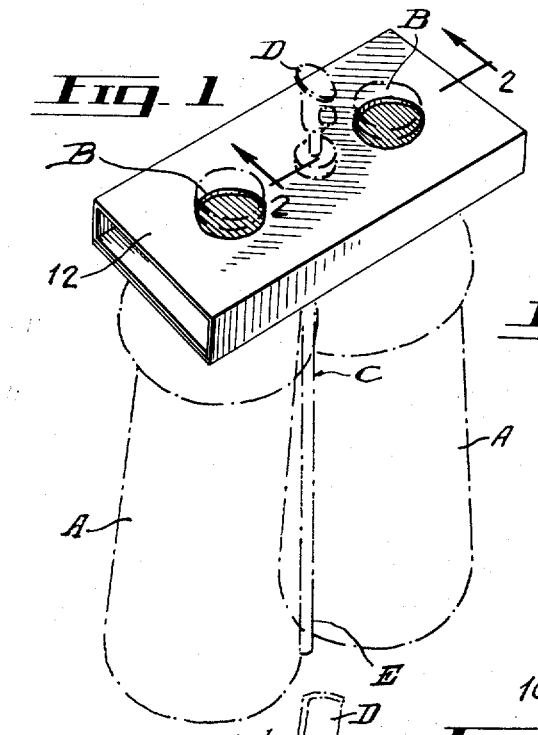
FIGURE 1 is a preferred embodiment of the package of the invention shown in perspective elevation and being utilized to retain for display purposes two bottles and a plunger pump type spray dispenser.

With particular reference to FIGURE 1 of the drawings, a preferred embodiment of a double bottle and premium holding package unit in accordance with the invention is shown as holding for display a pair of bottles "A" having screw-on caps "B" and between the caps "B" a plunger-pump type of fluid spray dispenser "C."

Figure 6:
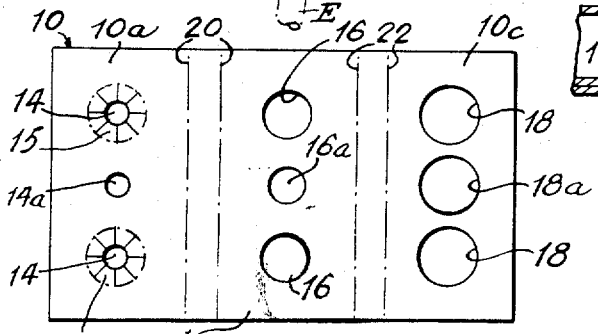
FIGURE 6 is a view in plan of a one piece blank adapted to form the package or holder of FIGURE 1.

The unit shown is made up from a one piece blank 10 of cardboard or paperboard, see FIGURE 6, which is scored and folded, as will be described to form a relatively shallow [open-ended] box 12. The blank 10 is provided with a first row of openings 14, 14a, with the spaced-apart openings 14 each having a radially slotted peripheral margin 15 which permits the openings 14 to be deformed as they are pressed over the caps "B" and to form retaining flanges against the lower rims of the caps when in position. The centrally located opening 14a is of a sufficient diameter to accommodate the stem only of the dispenser "C."

Figure 3:
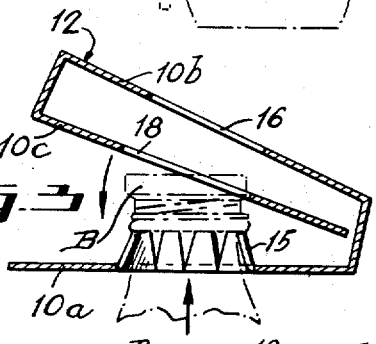
FIGURE 3 is a transverse sectional view of the construction shown in FIGURE 1 illustrating the first step in applying the holder of the invention.
Figure 5:
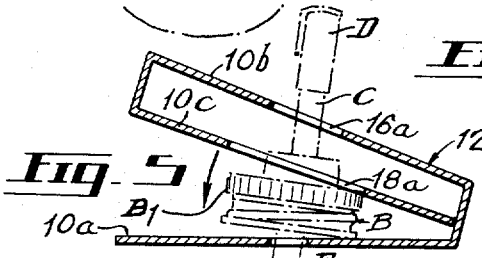
FIGURE 5 is a sectional view corresponding to FIGURE 3 to illustrate the relative position of the dispenser top during the initial steps of application of the holder.
Figure 4:
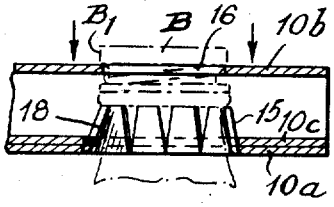
FIGURE 4 is a sectional view corresponding to FIGURE 3 to illustrate the second step in applying the holder of the invention.

The second row of openings 16, 16a on the blank 10 corresponds in spacing and alignment with the openings 14, 14a with the difference that the openings 16 are sufficiently greater in diameter to fit over the caps "B" and the central opening 16a is sufficiently greater in diameter to fit over the top portion "D" of the dispenser "C." The last row of openings 18, 18a is of sufficient diameter to fit easily over the bottle caps "B" and the corresponding cap portion "B1" of the dispenser "C." The blank 10 is scored as indicated at 20, 20 and 22, 22 so that it can be folded up into bottle and dispenser holding position, as shown in FIGURES 3, 4 and 5.

As is shown in FIGURES 3, 4 and 5, the first blank portion 10a is placed over the aligned bottles "A" and pressed down in position so as to deform the slotted margins 15 into retaining position. The blank portion 10c, containing the intermediate third row of openings 18, 18a is then folded inwardly of the second portion 10b, as shown in FIGURE 3. The protruding top "D" of the dispenser "C" is inserted in the opening 16a and the blank portions 10b, 10c pushed down into place as shown in FIGURE 4. With this arrangement the dispenser cap "B1" is locked between the blank portions 10a, 10b, 10c so that the dispenser "C" cannot be withdrawn without removing the unit from engagement with the bottles "A."

Figure 2:
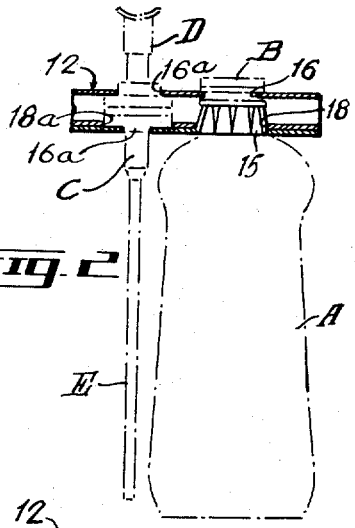
FIGURE 2 is a cross-sectional view of the construction shown in FIGURE 1 along the line 2—2 to illustrate the construction in more detail.

As will be understood by reference to the preceding description and accompanying drawings the height of the [open ended] box 12 forming the package unit of the invention may be varied to suit bottle or can necks of varying lengths. Further, as an alternative construction, a similar design can be utilized in combination with a single bottle "A" and a dispenser premium. In this case, the unit would appear as shown in FIGURE 2 from the line "A—A." In the blank one of the openings 14, 16 and 18 would be deleted and the width of the blank reduced accordingly.

As an added feature of the construction illustrated the protruding top "D" of the dispenser "C" acts as a convenient handle for the easy carrying of the bottles "A."

What is claimed is:

1. A combination display package for a fluid container and dispenser comprising:

at least one container having a restricted neck;

a sealing cap secured to said neck;

a dispenser for connection to said container;

said dispenser comprising a lower stem portion, an intermediate cap, and an upper protruding top portion;

said stem and top portions having a cross-section less than the cross-section of said intermediate cap on said dispenser; and a relatively shallow, [open-ended] box-like, package-forming element including a bottom, top and intermediate panel, a first side panel connecting said top and intermediate panels and a second side panel connecting said top and bottom panels;

said package-forming element being mounted on said container and dispenser and normally preventing removal of said dispenser without substantial dismantling of said package;

said bottom panel, top and intermediate panels including transverse, aligned apertures surrounding said dispenser and said container;

the apertures surrounding said dispenser including an aperture in the bottom panel surrounding said lower stem portion, an aperture in the intermediate panel surrounding said intermediate cap, and an aperture in the top panel surrounding the upper protruding portion;

said dispenser surrounding apertures in said bottom and top panels being of an area smaller than said dispenser cap and preventing longitudinal movement thereof;

said bottom panel engaging beneath said container and dispenser caps;

said intermediate panel receiving said container and dispenser caps therethrough, and said top panel overlying and preventing longitudinal movement of said dispenser cap.

2. The package as claimed in claim 1 including a second container similar to said first described container, said panels including apertures accommodating said containers in flanking relation to said dispenser, said bottom panel comprising deformable, gripping portions at said aperture and grippingly engaging said containers beneath said sealing caps.

References Cited by the Examiner

The following references, cited by the Examiner, are of record in the patented file of this patent or the original patent.

UNITED STATES PATENTS

| | | | |
|---|---|---|---|
| 2,060,513 | 11/36 | Marx | 206—47 |
| 2,358,523 | 9/44 | McKinley | 229—22 |
| 2,646,202 | 7/53 | Gibbons | 229—40 |
| 2,721,689 | 10/55 | Nye | 229—40 |
| 2,737,326 | 3/56 | Toensmeier. | |
| 2,823,064 | 2/58 | Toensmeier. | |

THERON E. CONDON, *Primary Examiner.*